(12) United States Patent  
Lv et al.

(10) Patent No.: US 10,204,271 B2  
(45) Date of Patent: Feb. 12, 2019

(54) IMAGE COMPOSITION EVALUATING APPARATUS, INFORMATION PROCESSING APPARATUS AND METHODS THEREOF

(71) Applicant: CANON KABUSHIKI KAISHA, Tokyo (JP)

(72) Inventors: You Lv, Beijing (CN); Yong Jiang, Beijing (CN); Bo Wu, Beijing (CN); Xian Li, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 617 days.

(21) Appl. No.: 14/448,968

(22) Filed: Jul. 31, 2014

(65) Prior Publication Data

US 2015/0036921 A1 Feb. 5, 2015

(30) Foreign Application Priority Data

Aug. 2, 2013 (CN) .......................... 2013 1 0334287

(51) Int. Cl.
*G06K 9/00* (2006.01)
*G06T 7/11* (2017.01)
*G06T 7/00* (2017.01)
*G06T 7/187* (2017.01)

(52) U.S. Cl.
CPC ........ *G06K 9/00664* (2013.01); *G06T 7/0002* (2013.01); *G06T 7/11* (2017.01); *G06T 7/187* (2017.01); *G06T 2207/20021* (2013.01); *G06T 2207/20084* (2013.01); *G06T 2207/30168* (2013.01)

(58) Field of Classification Search
CPC ..... G06K 9/00664; G06T 7/11; G06T 7/0002; G06T 7/187; G06T 2207/20021; G06T 2207/20084; G06T 2207/30168
See application file for complete search history.

(56) References Cited

U.S. PATENT DOCUMENTS 5,479,533 A * 12/1995 Tanaka ................. G06K 9/6202 382/161
5,493,677 A * 2/1996 Balogh ............... G06F 17/3025 382/305

(Continued)

FOREIGN PATENT DOCUMENTS

CN 101212702 A 7/2008
CN 102196177 A 9/2011

(Continued)

OTHER PUBLICATIONS

Felzenszwalb, et al., "Object Detection with Discriminatively Trained Partbased Models", In IEEE Transactions on Pattern Analysis and Machine Intelligence, vol. 32, Issue 9 , Sep. 2010, 20 pages.*

(Continued)

*Primary Examiner* — Mia M Thomas
(74) *Attorney, Agent, or Firm* — Canon U.S.A., Inc. IP Division

(57) ABSTRACT

In the present invention, an attribution is extracted from each region obtained by segmentation of an image, relationships among the regions are described, and a composition of the image is evaluated based on the attributions and the relationships.

16 Claims, 19 Drawing Sheets

(56) References Cited

U.S. PATENT DOCUMENTS

| | | | | |
|---|---|---|---|---|
| 6,285,992 B1* | 9/2001 | Kwasny | ............... | G06K 9/6267 706/15 |
| 6,983,068 B2* | 1/2006 | Prabhakar | .......... | G06K 9/00456 382/162 |
| 8,594,385 B2* | 11/2013 | Marchesotti | ........... | G06K 9/036 382/112 |
| 8,600,108 B2* | 12/2013 | Tang | .................... | G06T 7/2033 382/103 |
| 8,732,175 B2* | 5/2014 | Butterfield | ........ | G06F 17/30265 707/748 |
| 8,749,661 B2* | 6/2014 | Ohki | ........................ | G06T 3/40 348/222.1 |
| 8,755,596 B2* | 6/2014 | Datta | ................ | G06K 9/00624 382/160 |
| 8,862,520 B2* | 10/2014 | Agarwal | .............. | G06N 99/005 706/12 |
| 8,954,423 B2* | 2/2015 | Chica | ............... | G06F 17/30699 382/162 |
| 9,082,047 B2* | 7/2015 | Marchesotti | ........... | G06K 9/627 |
| 9,280,565 B1* | 3/2016 | Rizk | ................. | G06K 9/00624 |
| 9,317,784 B2* | 4/2016 | Yano | ................ | G06T 7/0081 |
| 9,378,422 B2* | 6/2016 | Saruta | ............... | G06K 9/00664 |
| 9,424,493 B2* | 8/2016 | He | .................... | G06F 17/30247 |
| 9,430,829 B2* | 8/2016 | Madabhushi | ...... | G06K 9/00147 |
| 9,633,449 B2* | 4/2017 | Wang | ................... | G06T 5/007 |
| 9,721,340 B2* | 8/2017 | Gillies | .................. | A61B 6/463 |
| 9,754,152 B2* | 9/2017 | Ajemba | ............... | G06T 7/0012 |
| 9,760,801 B2* | 9/2017 | Bremer | ..................... | G06T 7/10 |
| 10,042,048 B1* | 8/2018 | Moya | .................. | G01S 13/9029 |
| 2001/0021261 A1* | 9/2001 | Koga | .................. | G06K 9/00469 382/101 |
| 2002/0191860 A1 | 12/2002 | Cheatle | | |
| 2003/0108237 A1* | 6/2003 | Hirata | ................. | G06F 17/3025 382/164 |
| 2004/0047513 A1* | 3/2004 | Kondo | .................... | G06T 7/403 382/254 |
| 2006/0098870 A1* | 5/2006 | Tek | ........................ | G06K 9/342 382/173 |
| 2006/0242139 A1* | 10/2006 | Butterfield | ........ | G06F 17/30265 |
| 2007/0054350 A1* | 3/2007 | Walker, Jr. | ............ | G06T 7/0012 435/34 |
| 2007/0270985 A1* | 11/2007 | Shellshear | ............ | G06F 3/0481 700/87 |
| 2007/0288435 A1* | 12/2007 | Miki | .................... | G06F 17/3025 |
| 2010/0040285 A1* | 2/2010 | Csurka | ............... | G06K 9/00624 382/170 |
| 2010/0066761 A1* | 3/2010 | Tousch | ................... | G06K 9/342 345/629 |
| 2012/0036097 A1* | 2/2012 | Prokhorov | ......... | G06K 9/00845 706/20 |
| 2012/0269425 A1* | 10/2012 | Marchesotti | ........... | G06K 9/036 382/159 |
| 2013/0127893 A1* | 5/2013 | Gokturk | ............... | G06F 17/3025 345/582 |
| 2013/0172154 A1* | 7/2013 | Kim | .................... | G06F 19/3481 482/8 |
| 2014/0056518 A1* | 2/2014 | Yano | .................... | G06K 9/6267 382/173 |
| 2014/0063275 A1* | 3/2014 | Krahenbuhl | ......... | H04N 19/117 348/208.4 |
| 2014/0161313 A1* | 6/2014 | Ohishi | ............... | G06K 9/00604 382/103 |
| 2014/0254866 A1* | 9/2014 | Jankowski | ......... | G06K 9/00771 382/103 |
| 2014/0314312 A1* | 10/2014 | Hashiguchi | ........... | G06T 7/0093 382/164 |
| 2015/0109474 A1* | 4/2015 | Saruta | ................ | G06K 9/00664 348/222.1 |
| 2015/0110390 A1* | 4/2015 | Gershon | ............. | G06F 17/3025 382/164 |
| 2015/0186752 A1* | 7/2015 | Xu | .......................... | G06F 21/32 382/128 |
| 2015/0254529 A1* | 9/2015 | Lv | ............................ | G06K 9/72 382/159 |
| 2015/0254572 A1* | 9/2015 | Blohm | ................. | G06N 99/005 706/12 |
| 2015/0279049 A1* | 10/2015 | Tojo | ..................... | G06T 7/0081 382/164 |
| 2015/0332117 A1* | 11/2015 | Zhou | ....................... | G06T 5/008 382/201 |
| 2016/0048786 A1* | 2/2016 | Fukuda | ............ | G06Q 10/06313 705/7.23 |
| 2016/0098618 A1* | 4/2016 | Shaji | ................... | G06K 9/00624 382/160 |
| 2016/0098842 A1* | 4/2016 | Frosio | ........................ | G06T 7/11 382/199 |
| 2016/0133027 A1* | 5/2016 | Zhao | ...................... | G06T 7/0081 382/173 |
| 2017/0287252 A1* | 10/2017 | Laddha | ................ | G07D 7/2016 |
| 2018/0025253 A1* | 1/2018 | Bremer | ................ | G06K 9/6218 |

FOREIGN PATENT DOCUMENTS

| | | |
|---|---|---|
| CN | 103201769 A | 7/2013 |
| WO | 2010027079 A1 | 3/2010 |

OTHER PUBLICATIONS

Achanta et al. "Slic superpixels compared to state-of-the-art superpixel methods," IEEE Transactions on Pattern Analysis and Machine Intelligence, vol. 34(11):2274-2281, 2012.*

H. Y. Lee, et al. "Towards Knowledge-Based Extraction of Roads from 1m-resolution Satellite Images", Proc. of the IEEE Southwest Symposium on Image Analysis and Interpretation, Austin, Tex., Apr. 2000, pp. 171-176.*

* cited by examiner

IMAGE COMPOSITION EVALUATING APPARATUS, INFORMATION PROCESSING APPARATUS AND METHODS THEREOF

CROSS-REFERENCE TO RELATED APPLICATIONS

This application claims the benefit of Chinese Application No. 201310334287.7, filed Aug. 2, 2013, which is hereby incorporated by reference herein in its entirety.

BACKGROUND OF THE INVENTION

Field of the Invention

The present invention relates in general to the fields of image processing and computer vision, in particular to an image composition evaluating apparatus, an information processing apparatus and methods thereof.

Description of the Related Art

The quality of an image is determined not only by its content, but also by its composition. Take photographic images as an example. Many pictures include views people want to shoot, yet they still look unattractive due to various composition problems. Since composition is too complicated for beginners, most beginners need an intelligent camera to help them to get better pictures.

To deal with this situation, Fujifilm has proposed an imaging apparatus with Human Composition Judgement, which can judge whether the composition is appropriate or not based on human extraction results. FIG. 1 and FIGS. 2-3 show a schematic view and flowcharts of Fujifilm's Human Composition Judgement method, respectively. As shown in FIG. 2, first, at step 210, human objects are extracted based on face detection in an image (the human object extraction result is shown by a solid rectangle in FIG. 1). Next, at step 220, non-human objects are extracted based on special object detection in regions except for the human object extraction region of the image (the non-human object extraction results are shown by polygons in FIG. 1). Finally, at step 230, arrangement balance is evaluated based on whether gravity centers of objects are within a predetermined region of the image. FIG. 3 gives a more detailed flowchart of the arrangement balance evaluation step. As shown in FIG. 3, at steps 310 and 320, the gravity center of each human object and that of each non-human object are calculated, respectively; then, at step 340, judgement is made as to whether the gravity center is within a predetermined region of the image or not. Meanwhile, at step 330, the gravity center of all human and non-human objects is calculated based on results of steps 310 and 320; and then at step 350, judgement is made as to whether the gravity center is far from a center region of the image or not. Finally, at step 360, evaluation is made as to whether the arrangement balance is appropriate or not based on results of steps 340 and 350. In the example shown in FIG. 1, the cross inside the solid rectangle indicates the gravity center of the extracted human object, the crosses inside the polygons indicate the gravity centers of the extracted non-human objects, cross A indicates the gravity center of all human and non-human extracted objects, and cross B indicates the image center. As a result, it is evaluated that the composition of the image shown in FIG. 1 is not good (i.e., gravity center A is low), and thus it is proposed that screen may be zoomed to a position shown by a dashed rectangle in FIG. 1 so that gravity center A is not far from image center B.

However, the above Human Composition Judgement method has many limits.

First, such a method can only deal with pictures with detected human faces. This means that other pictures, such as landscape pictures without special object (see FIG. 25C), object pictures without human (see FIGS. 25D-25E) and even human backside pictures without face (see FIG. 25B), cannot be evaluated at all.

Second, such a method can only help to make a human object in a center region of an image, which is not enough for a good composition. For example, because this method does not care about the scale of a human object, the human object may not be outstanding (see FIG. 25B); because this method does not care about the relationship between a human object and a non-human object, the human position may be uncomfortable (see FIG. 25A); because this method does not care about the background environment, unreasonable composition may be caused by disproportional background (see FIG. 25D) etc.

Therefore, it is desired that a new image composition evaluating apparatus and a method thereof, which are capable of evaluating more kinds of images and/or more kinds of composition problems, can be provided.

SUMMARY OF THE INVENTION

The present invention is proposed in view of at least one of the above problems.

One object of the present invention is to provide a new image composition evaluating apparatus, a new information processing apparatus, a new image composition evaluating method and a new information processing method.

Another object of the present invention is to provide an image composition evaluating apparatus, an information processing apparatus, an image composition evaluating method and an information processing method which can evaluate more kinds of images, including landscape images without special object, object images without human, human backside images without face etc.

Yet another object of the present invention is to provide an image composition evaluating apparatus, an information processing apparatus, an image composition evaluating method and an information processing method which can evaluate more kinds of composition problems, including object on head, area size judgement, major object position judgement, kissing border, close to border, middle separation, color mismatching etc.

According to a first aspect of the present invention, there is provided an apparatus for evaluating image composition comprising: a region segmentation unit configured to segment an image into a plurality of regions; a region attribution extraction unit configured to extract at least one attribution from each of the regions; a region relationship description unit configured to describe relationships among the regions based on the extracted attributions; and a composition evaluation unit configured to evaluate the composition of the image based on the extracted attributions, the described relationships and at least one preset criterion.

According to a second aspect of the present invention, there is provided an information processing apparatus, comprising the apparatus for evaluating image composition as described above.

According to a third aspect of the present invention, there is provided a method for evaluating image composition comprising: segmenting an image into a plurality of regions; extracting at least one attribution from each of the regions; describing relationships among the regions based on the extracted attributions; and evaluating the composition of the image based on the extracted attributions, the described relationships and at least one preset criterion.

According to a fourth aspect of the present invention, there is provided an information processing method, comprising the method for evaluating image composition as described above.

By virtue of the above features, the image composition evaluating apparatus, the information processing apparatus, the image composition evaluating method and the information processing method of the present invention can evaluate more kinds of images, including landscape images without special object, object images without human, human backside images without face etc.

In addition, by virtue of the above features, the image composition evaluating apparatus, the information processing apparatus, the image composition evaluating method and the information processing method of the present invention can evaluate more kinds of composition problems, including object on head, area size judgement, major object position judgement, kissing border, close to border, middle separation, color mismatching etc.

Further objects, features and advantages of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate embodiments of the present invention and, together with the description, serve to explain the principles of the present invention.

DESCRIPTION OF THE EMBODIMENTS

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

Figure 1:
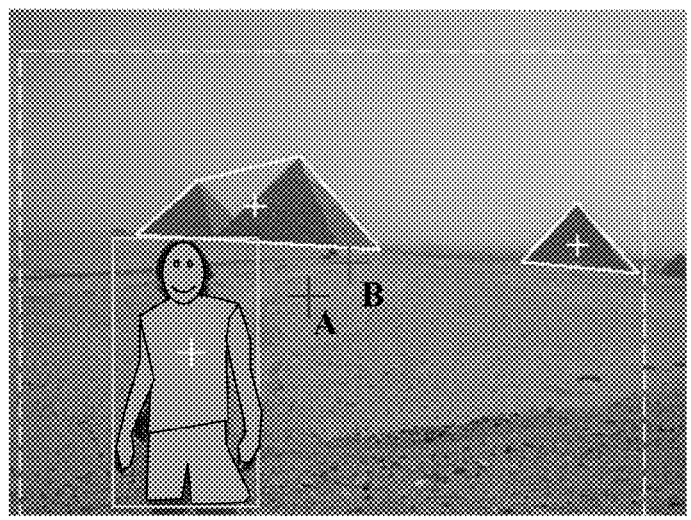
FIG. 1 is a schematic view of Fujifilm's Human Composition Judgement method.
Figure 2:
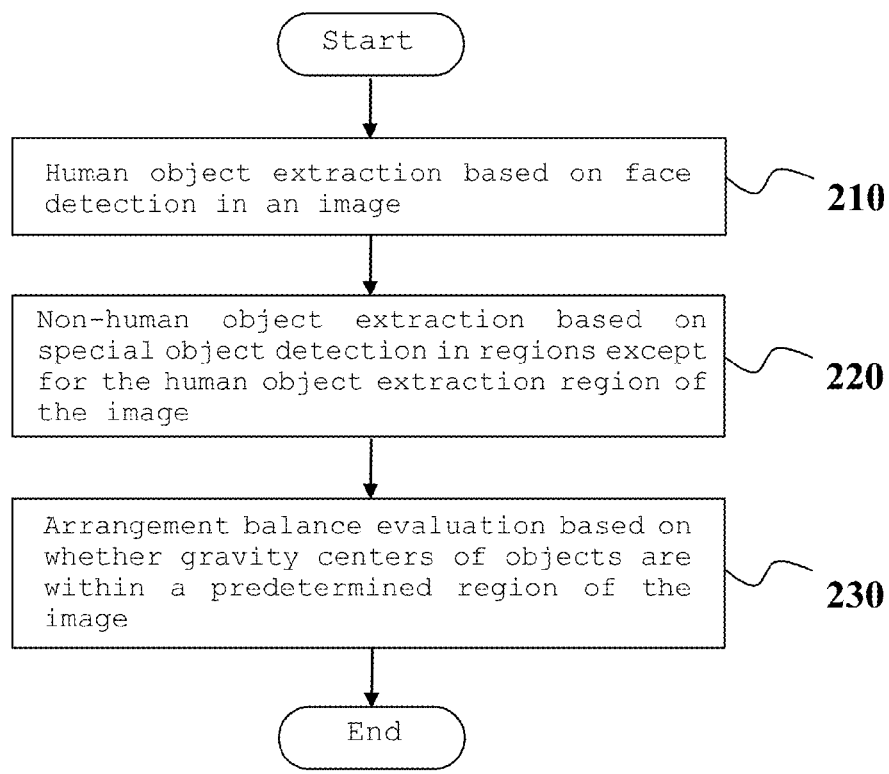
FIG. 2 schematically shows a flowchart of Fujifilm's Human Composition Judgement method.
Figure 3:
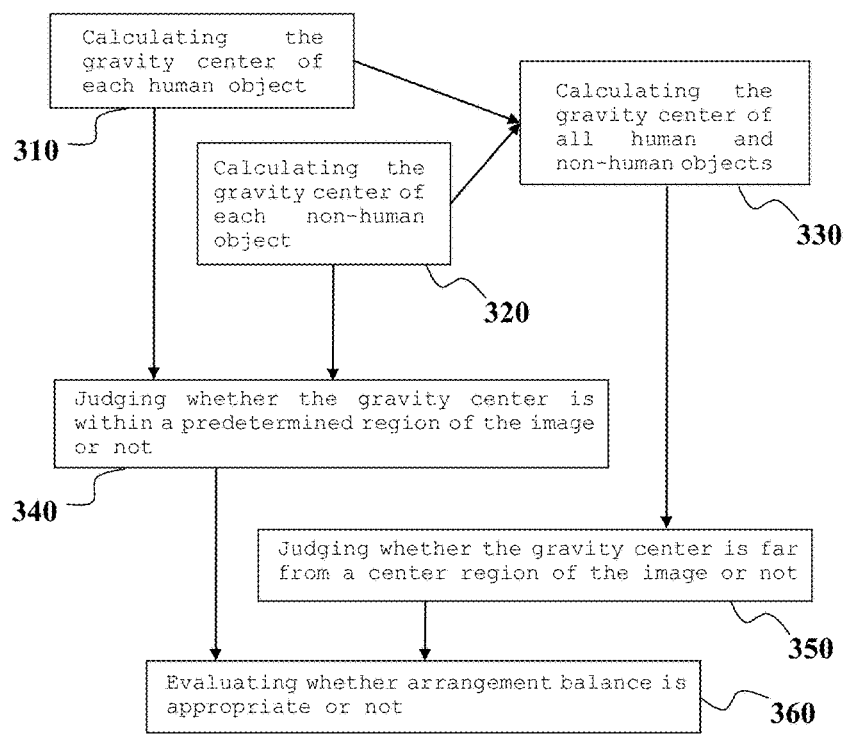
FIG. 3 schematically shows a flowchart of the arrangement balance evaluation step of Fujifilm's Human Composition Judgement method.
Figure 4A:
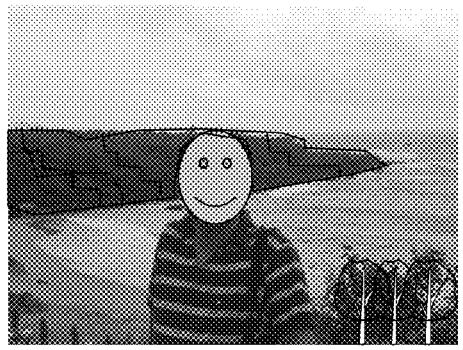
FIGS. 4A-4D schematically show an example of Fujifilm's Human Composition Judgement method.
Figure 4B:
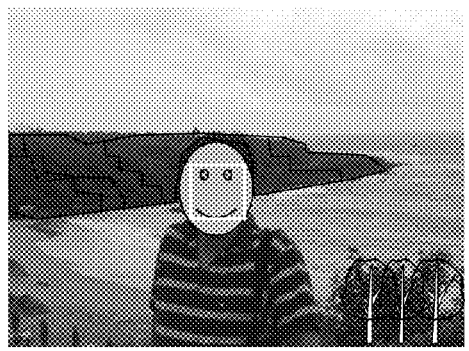
Figure 4C:
Figure 4D:
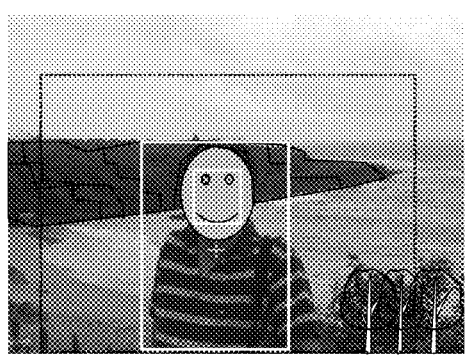

As mentioned earlier, the Human Composition Judgement method is based on major objects (especially based on human objects), and thus has many limits (e.g., it cannot evaluate most of the images and problems in FIGS. 25A-25E). After extensive and in-depth research, the inventors of the present invention have found out a new image composition evaluating method based on image regions, which is capable of evaluating almost all kinds of images and/or almost all kinds of composition problems (e.g., it can evaluate all the images and problems in FIGS. 25A-25E). For brief comparison, FIGS. 4A-4D and FIGS. 16A-16D schematically show an example of Fujifilm's Human Composition Judgement method and an example of the image composition evaluating method according to the present invention, respectively. It can be noted that FIG. 4A is identical with FIG. 16A, i.e., the input image to be evaluated on composition is the same. In the method of FIGS. 4A-4D, first, the human face is extracted (FIG. 4B); next, the body gravity center is calculated as shown by a cross in a rectangle in FIG. 4C; finally, it is evaluated that the body gravity center is low, and thus it is proposed that a picture may be taken as shown by a dashed rectangle in FIG. 4D so that the body gravity center is inside the image center region. In contrast, in the method of FIGS. 16A-16D, first, the image is segmented into a plurality of regions (FIG. 16B); next, attributions inside each region are extracted and relationships among the regions are calculated (in FIG. 16C, for clarity, edges of classified regions are shown); finally, it is evaluated that not only the human body is low (just as the Human Composition Judgement method suggests), but also kissing border problem occurs in the ellipse shown in FIG. 16D (the Human Composition Judgement method cannot detect such a composition problem at all).

Below, first, a schematic hardware configuration of a computing device 5000 which can implement the image composition evaluating method and the information processing method according to the present invention will be described with reference to FIG. 5. For the sake of simplicity, only one computing device is shown. However, a plurality of computing devices can also be used as needed.

Figure 5:
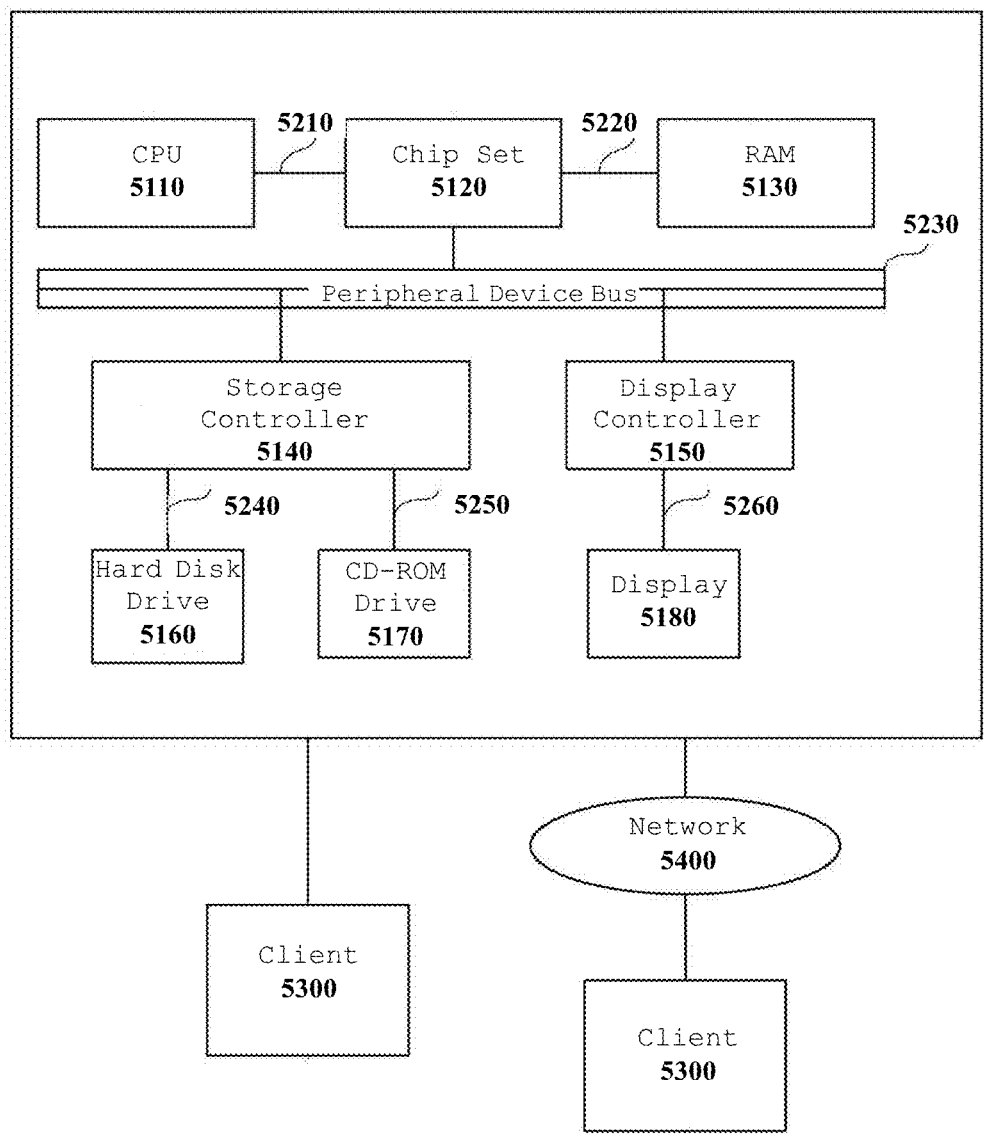
FIG. 5 is a schematic block diagram of a hardware configuration of a computing device which can implement the image composition evaluating method and the information processing method according to the present invention.

As shown in FIG. 5, the computing device 5000 can comprise a CPU 5110, a chip set 5120, a RAM 5130, a storage controller 5140, a display controller 5150, a hard disk drive 5160, a CD-ROM drive 5170, and a display 5180. The computing device 5000 can also comprise a signal line 5210 that is connected between the CPU 5110 and the chip set 5120, a signal line 5220 that is connected between the chip set 5120 and the RAM 5130, a peripheral device bus 5230 that is connected between the chip set 5120 and various peripheral devices, a signal line 5240 that is connected between the storage controller 5140 and the hard disk drive 5160, a signal line 5250 that is connected between the storage controller 5140 and the CD-ROM drive 5170, and a signal line 5260 that is connected between the display controller 5150 and the display 5180.

A client 5300 can be connected to the computing device 5000 directly or via a network 5400. The client 5300 can send an image composition evaluating task and/or an information processing task to the computing device 5000, and the computing device 5000 can return image composition evaluating results and/or information processing results to the client 5300.

Next, the image composition evaluating method and the information processing method according to the present invention will be described in detail. In the present invention, photographic images are taken as an example for description; however, it is readily apparent that the present invention can be applied to any kinds of images.

Figure 6:
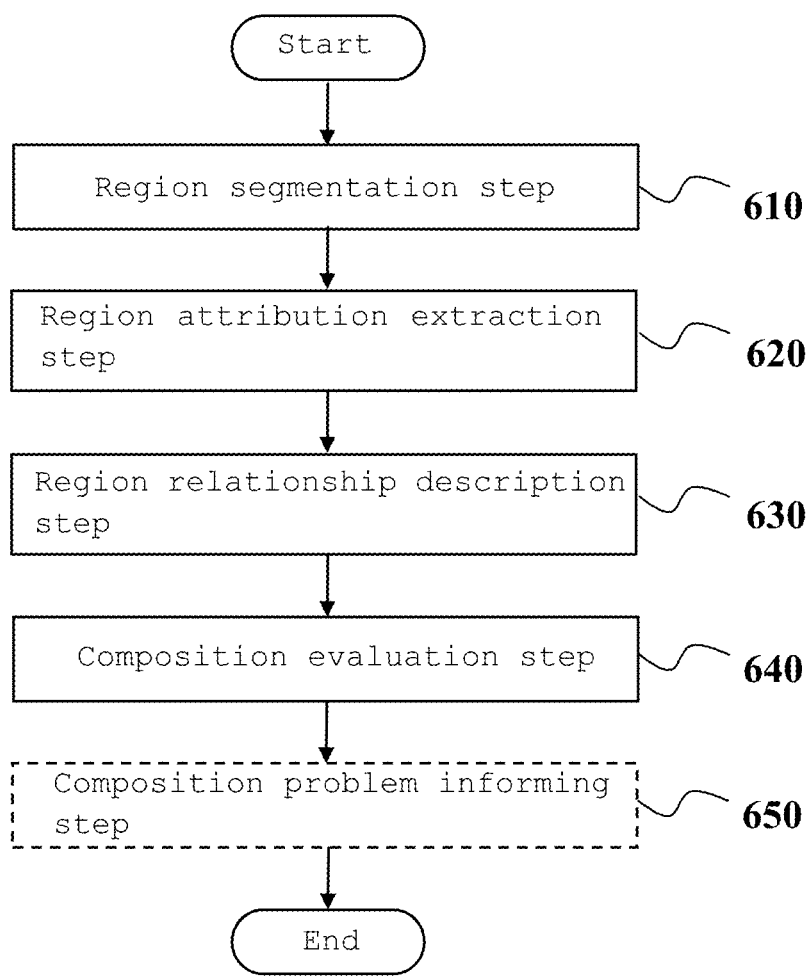
FIG. 6 schematically shows a general flowchart of the image composition evaluating method according to the present invention.

FIG. 6 schematically shows a general flowchart of the image composition evaluating method according to the present invention.

Figure 16A:
FIGS. 16A-16D schematically show an example of the image composition evaluating method according to the present invention.
Figure 16B:
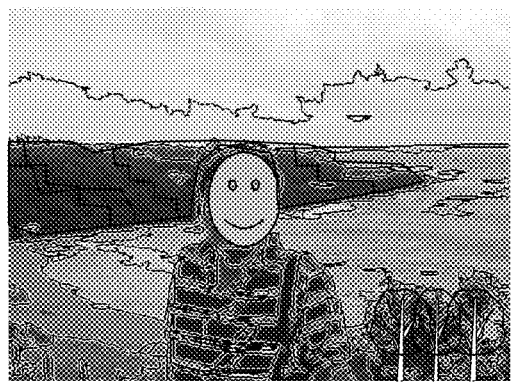
Figure 16C:

As shown in FIG. 6, first, at step 610 (region segmentation step), an image is segmented into a plurality of regions (see FIG. 16B).

Figure 17A:
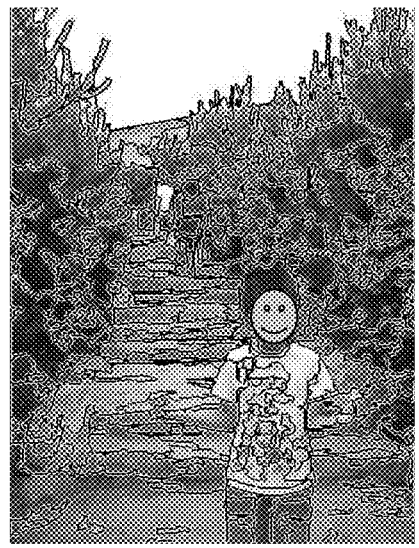
FIGS. 17A-17B are schematic comparison views of a Felzenszwalb over-segmentation method and an SLIC over-segmentation method.
Figure 17B:
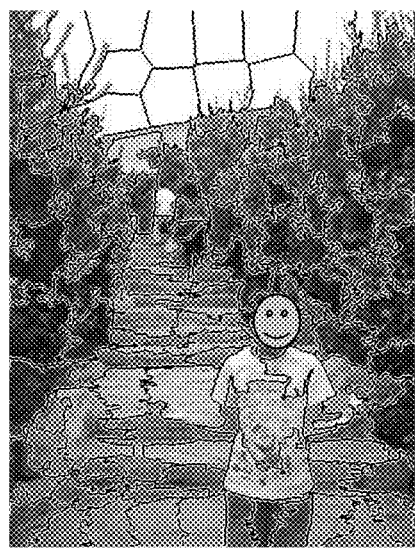

The segmentation method is not particularly limited, as long as the image is segmented into a plurality of non-overlapped regions and the plurality of non-overlapped regions as a whole constitutes the image. For example, an over-segmentation method can be employed to segment the image into a plurality of regions called super-pixels. Pixels inside each super-pixel are much similar. The employed over-segmentation method can be a Felzenszwalb method (reference can be made to Pedro F. Felzenszwalb, Daniel P. Huttenlocher, 'Efficient Graph-based Image Segmentation', International Journal of Computer Vision, Vol. 59, No. 2, September 2004), an SLIC method (reference can be made to Radhakrishna Achanta, Appu Shaji, Kevin Smith et al., 'SLIC Superpixels', EPFL Technical Report, No. 149300, June 2010) etc. FIGS. 17A-17B show a Felzenszwalb over-segmentation method and an SLIC over-segmentation method, respectively. As can be seen from comparison of FIGS. 17A-17B, different over-segmentation methods result in different segmented regions. However, this will not make radical influence on the composition evaluation result. Alternatively, any other suitable methods can also be employed to segment the image into a plurality of regions. For example, even a simple method of segmenting the image into an m×n square grid (where m and n are positive integers) can be employed in the region segmentation step 610. Of course, here, the larger m and n, the better the composition evaluation result.

Next, at step 620 (region attribution extraction step), at least one attribution is extracted from each of the regions.

Figure 7:
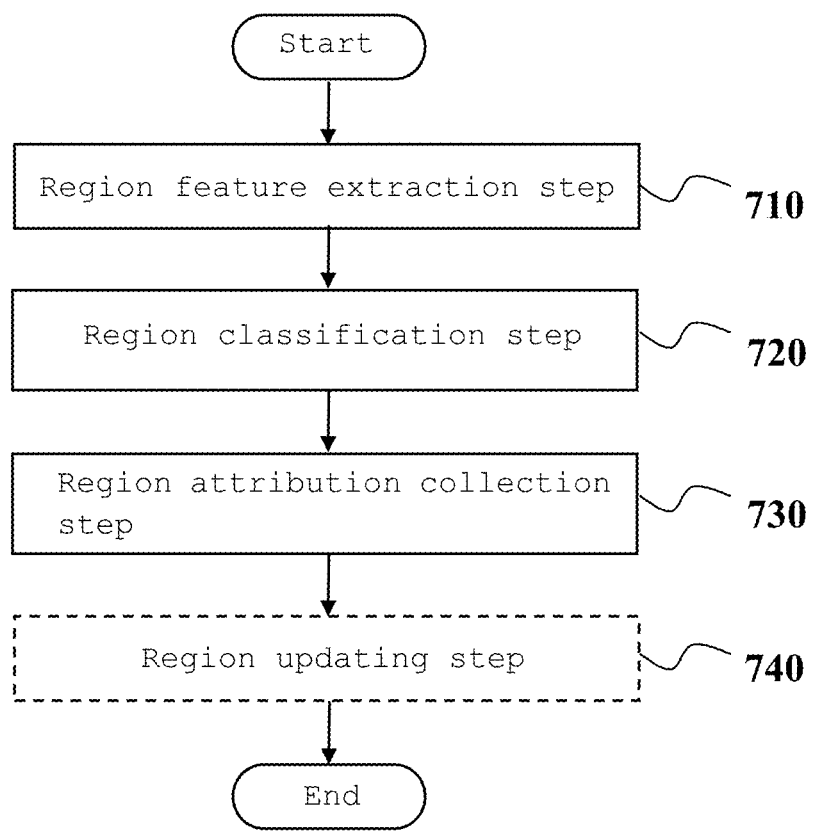
FIG. 7 schematically shows a flowchart of a region attribution extraction step of the image composition evaluating method according to the present invention.

FIG. 7 gives an exemplary flowchart of the region attribution extraction step.

As shown in FIG. 7, at step 710 (region feature extraction step), at least one feature is first extracted from each of the regions.

The extracted features are used to describe attributions of the segmented regions. Therefore, as long as desired attributions can be described, the type and number of the extracted features are not particularly limited (incidentally, the extracted features for each of the regions are identical). For example, features such as SVL (STAIR Vision Library), LBP (Local Binary Patterns) and the like can be used in the region feature extraction step. Although different features may cause something different in the subsequent region classification step, this will not make radical influence on the composition evaluation result. Generally, the extracted features will be a matrix, in which each row represents features of a region (or a super-pixel) in an image, and each column represents a feature value of all regions (or all super-pixels) in the image.

Then, at step 720 (region classification step), each of the regions is classified into a preset class based on the extracted at least one feature and a trained model.

Figures 18, 19:
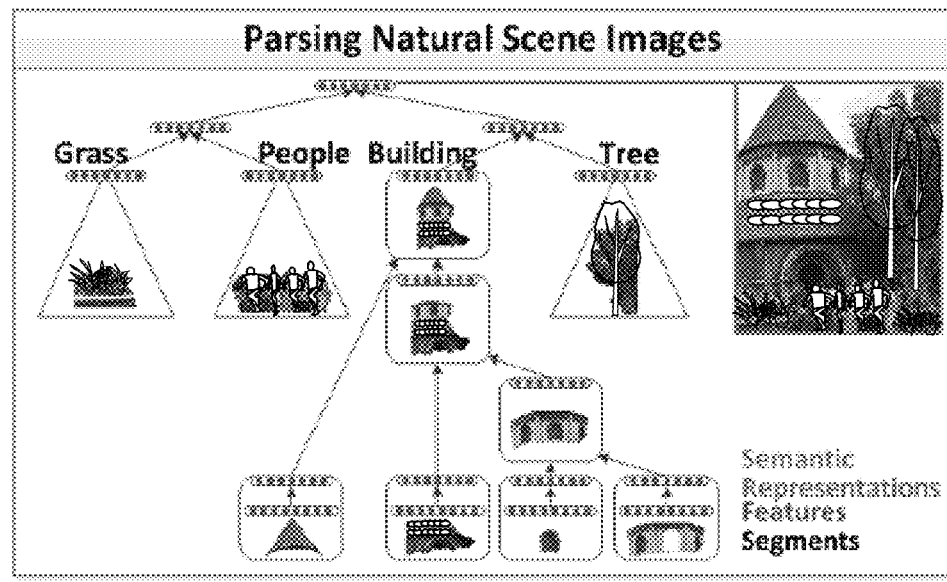
FIG. 18 is a schematic view of the RNN method.
FIG. 19 is a schematic view of RNN training inputs.
Figure 20:
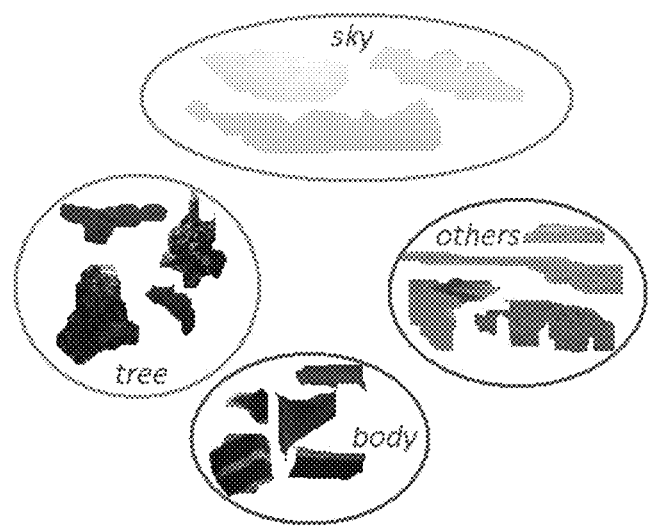
FIG. 20 schematically shows a result of the region classification step in the region attribution extraction step of the image composition evaluating method according to the present invention.

The classification method is not particularly limited, and any suitable classification method can be employed in the region classification step. In one embodiment of the present invention, the Recursive Neural Network (RNN) method is employed to multi-class segment the whole input image into different classified regions. FIG. 18 gives a schematic view of the RNN method. In the RNN method, as shown in FIG. 18, segment features are first mapped into a semantic feature space, and then recursively merged by the same neural network until they represent the entire image. Both mapping and merging are learned. The RNN method will calculate the score of each region (or super-pixel) in every preset class by using the trained model, and choose a class as the label of each region (or super-pixel) based on the calculated scores. In the example of an input image as shown in FIG. 16A, the preset classes can be sky, tree, body and others, and FIG. 20 schematically shows the corresponding region classification result.

Incidentally, which types of region must be detected or which types of class must be preset is not particularly limited in the present invention. It depends on the specific input image. For example, if human is captured in the image, human itself and relationships between human and other regions will be analyzed; if landscape is captured in the image, relationships between different regions will be analyzed.

Figure 8:
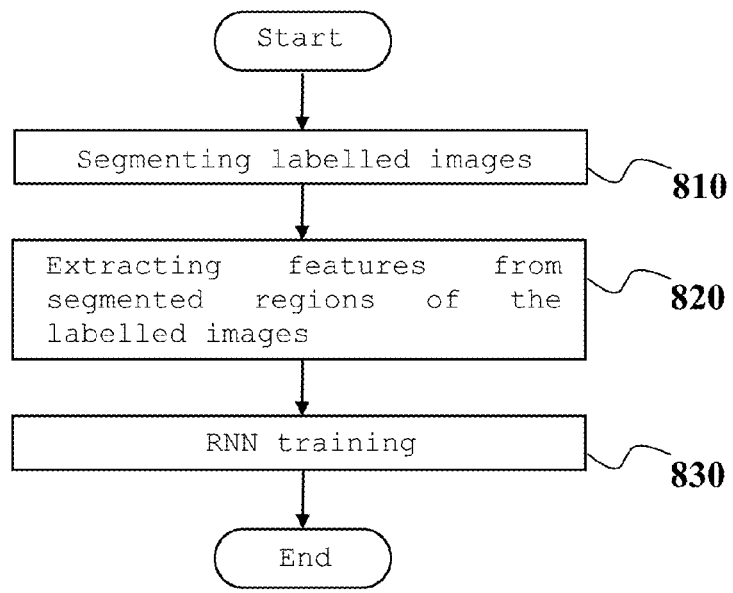
FIG. 8 schematically shows how to obtain a trained Recursive Neural Network (RNN) model.
Figure 9:
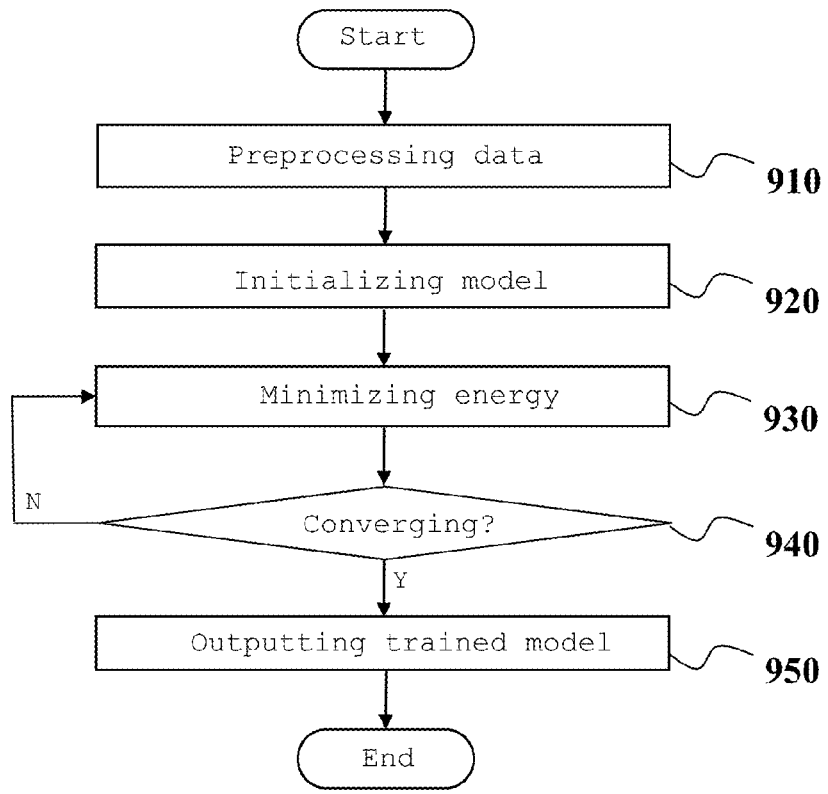
FIG. 9 schematically shows a flowchart of a RNN training step.

Here, brief description will be made on the RNN training method. FIGS. 8-9 schematically show how to obtain a RNN trained model from labelled images (which contain labelled class information).

As shown in FIG. 8, at step 810, the labelled images are segmented to obtain segment files. Then, at step 820, features are extracted from segmented regions of the labelled images to obtain feature files. The features can, for example, include color and texture features, boosted pixel classifier scores (trained on the labelled training data), appearance and shape features etc. Incidentally, step 810 and step 820 shall be the same as step 610 and step 710 respectively, i.e., the same segmentation method shall be employed and the same features shall be extracted for both the training images and the image to be evaluated on composition.

Finally, at step 830, RNN training is performed by using for example the segment files, the feature files, and ground truth label files and list files so as to obtain the RNN trained model for use in the region classification step 720.

FIG. 19 schematically shows RNN training inputs. In FIG. 19, the second row shows an input instance of the training image, in which regions 1-2 and regions 3-5 are differently labelled regions. The third row shows an adjacency matrix of the regions. The adjacency matrix A is symmetric, where A(i, j)=1, if region i is adjacent to region j; or else, A(i, j)=0. FIG. 19 also shows, at its fourth row, a set of correct trees which are oblivious to the order by which regions with the same label are merged.

Simply speaking, the RNN training step 830 iterates parameters based on all the labelled features of sample regions. FIG. 9 gives an exemplary flowchart of the RNN training step. As shown in FIG. 9, at step 910, data is preprocessed; at step 920, the model is initialized; at step 930, energy is minimized; at step 940, whether it is converged or not is judged: if No, the process goes back to step 930, or else, the process advances to step 950 where a trained model is outputted. For more detailed description of the RNN training, reference can be made to Richard Socher, Cliff Chiung-Yu Lin, Andrew Y. Ng, 'Parsing Natural Scenes and Natural Language with Recursive Neural Networks', Proceeding of the 28th International Conference on Machine Learning, Bellevue, Wash., USA, 2011 (FIGS. 18-19 are excerpted therefrom).

Now going back to FIG. 7. Next, at step 730 (region attribution collection step), at least one attribution for each of the regions is collected.

The attributions are used for image composition evaluation, and depend on the preset criteria for image composition evaluation. For example, the attributions can comprise at least one of class, position, size, color, texture and the like. Needless to say, the attributions can also be any other suitable attributions required for image composition evaluation. Besides, the order for collecting the attributions is not particularly limited.

As for the attribution of class, it can, for example, be simply fetched from the result of the region classification step 720. As mentioned earlier, which types of class can be used is not particularly limited. It depends on the specific input image.

As for the attribution of position, which types of position can be used is not particularly limited. It only needs to let all regions have the same position attribution collected. For example, the attribution of position can be a region's gravity center position and bounding box position. Alternatively, the attribution of position can be a region's contour center position. The gravity center $G_{center}(A)$ of a region A can be expressed by the following equation (1):

$$G_{Center}(A) = \frac{\Sigma_p(x_p, y_p)}{\text{Count}(p)} \quad (x_p, y_p) \in A \tag{1}$$

where $(x_p, y_p)$ is coordinates of pixel p, and Count (p) is the total pixel number inside region A.

Figure 21:
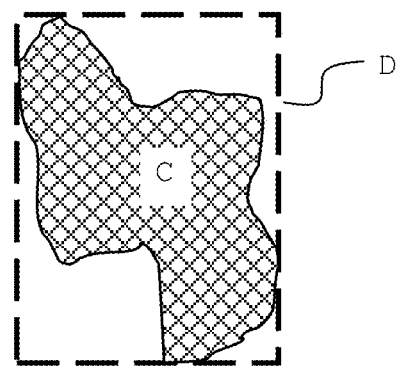
FIG. 21 schematically shows how to calculate the size attribution in the region attribution extraction step according to the present invention.

As for the attribution of size, which types of size can be used is not particularly limited. It only needs to let all regions have the same size attribution collected. For example, the attribution of size can be a region's area (as shown by the cross lines for region C in FIG. 21). Alternatively, the attribution of size can be a region's bounding box area or scales (as shown by the dashed rectangle D for region C in FIG. 21).

As for the attribution of color, which types of color can be used is not particularly limited. It only needs to let all regions have the same color attribution collected. For example, the attribution of color can be a region's color histogram. The extraction function can be described as the following equation (2):

$$H_A(k) = \sum_{(x_p, y_p) \in A} h(C(x_p, y_p))$$

$$h(C(x_p, y_p)) = \begin{cases} 1 & C(x_p, y_p) = k \\ 0 & \text{others} \end{cases} \tag{2}$$

where k is the dimensions of color attribution in the calculated color space, and $C(x_p, y_p)$ is the color at $(x_p, y_p)$.

Useful attributions such as texture and the like inside each region can also be extracted as needed.

Through the above steps 710-730, at least one attribution has been extracted from each of the regions in the region attribution extraction step 620.

Figure 10:
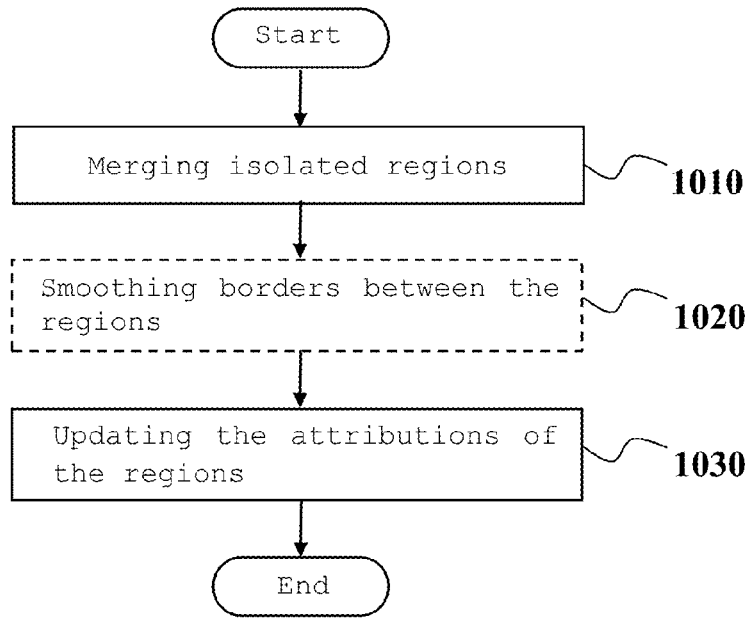
FIG. 10 schematically shows a flowchart of a region updating step in the region attribution extraction step according to the present invention.

Sometimes, after the region classifications step 720, if all regions are labelled according to their classes (e.g., in FIG. 22A, regions belonging to the same class are represented by the same grey level), it can be found that isolated regions (i.e., regions surrounded by other regions), such as region E, may exist. In such a case, in order to make the segmented regions more laconic and thus easy to extract major information from the image, a region updating step 740 can be optionally performed after the region attribution collection step 730 for merging isolated regions and updating the attributions of the regions. FIG. 10 schematically shows a flowchart of the region updating step 740.

As shown in FIG. 10, first, at step 1010, isolated regions are merged.

Figure 11:
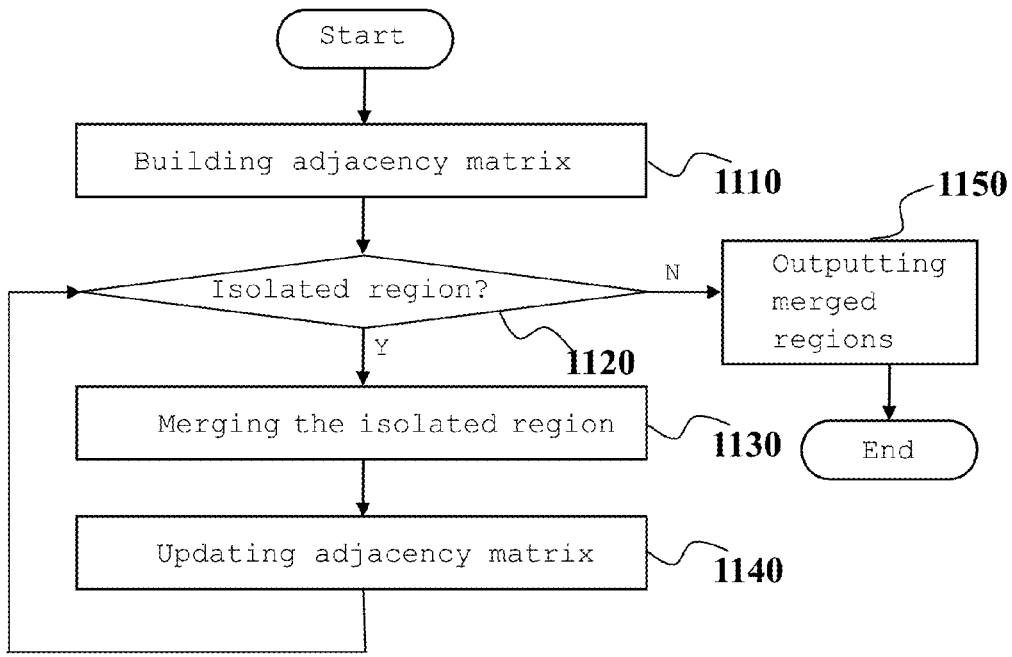
FIG. 11 schematically shows how to merge isolated regions in the region updating step according to the present invention.

FIG. 11 gives an exemplary flowchart of the isolated region merging step 1010.

Here, assuming that there are m regions in the image: P={$P_i$,i=1, 2, . . . , m}. The result of the region classification step 720 gives the class label of each region: C={$C_i$,i=1, 2, . . . , m}. The purpose is to remove isolated regions and get the new class label of each region thereafter: L'={$L'_i$,i=1, 2, . . . , n}, where n is the number of regions after merging and n≤m.

As shown in FIG. 11, at step 1110, an adjacency matrix is built. The adjacency matrix ADJ is an m×m matrix, where m is the number of regions. ADJ(i,j)=1 means that regions i and j are neighbours, and diagonal elements are zero, i.e., ADJ(i,i)=0, i=1, 2, . . . , m.

Next, at step 1120, it is judged whether there is any isolated region. If yes, the process advances to step 1130.

At step 1130, the isolated region is merged. The algorithm for step 1130 can be as follows. When regions surrounding one region all belong to the same class C, the class label of said one region is modified as C, and all these regions are merged to a region having the largest pixel number, i.e., the merged region has the ID number of the region having the largest pixel number.

Then, at step 1140, the adjacency matrix ADJ is updated accordingly and the process goes back to step 1120.

If it is judged there is not any isolated region, the process advances to step 1150. At step 1150, merged regions are outputted along with their class labels L'={L'$_i$, i=1, 2, . . . , n}.

Now going back to FIG. 10. After the isolated region merging step 1010, step 1030 for updating the attributions of the regions is performed.

After merging, if a plurality of regions merged into one region have more than one class, the class for the one merged region is the one that most of the plurality of regions have.

Other attributions can be updated as in the region attribution collection step 730, and the only difference lies in that step 730 is performed with respect to the segmented regions, whereas this attribution updating step is performed with respect to the merged regions.

Figure 22A:
FIGS. 22A-22B are schematic views of the region updating step in the region attribution extraction step according to the present invention.

As shown in FIG. 10, optionally, the region updating step can further comprise, after the isolated region merging step 1010 and before the region attribution updating step 1030, a border smoothing step 1020 for smoothing borders between the regions. This is because, sometimes, as shown in FIG. 22A where regions belonging to the same class are represented by the same grey level, borders between classified components may not be smooth. In such a case, the border smoothing step 1020 is further performed in order to make the regions more laconic and thus easy to extract major information from the image.

In the border smoothing step 1020, mathematical morphology (MM) can be employed. The basic morphological operators include erosion ($\ominus$) and dilation ($\oplus$). Opening ($\circ$) and closing ($\bullet$) are performed as combinations of different components. More specifically, if I is the image region to be processed, $S_E$ is the structuring element, the MM can be defined as the following equation (3):

$$I \ominus S_E = I - S_E$$

$$I \oplus S_E = I + S_E$$

$$I \circ S_E = (I - S_E) + S_E$$

$$I \bullet S_E = (I + S_E) - S_E \quad (3)$$

The transformations strictly depend on the geometry and topology of the structuring element. A smooth border β(I) can be calculated following several structuring elements. As an example, the smooth border extracted by dilation to erosion can be expressed as the following equation (4):

$$\beta(I) = (I \oplus S_E) - (I \ominus S_E) \quad (4)$$

Figure 22B:

FIGS. 22A-22B schematically show the merging and smoothing results. As can be seen from FIG. 22A, before merging and smoothing, there exist isolated regions such as region E, and the border near the human has many burrs. After merging and smoothing, as can be seen from FIG. 22B, isolated regions such as region E are merged (i.e., they do not exist any longer), and the border near the human looks quite smooth. Although the region updating step 740 is only optional (i.e., the present invention can still achieve its object of evaluating more kinds of images and/or more kinds of composition problems without merging and smoothing), it can make the regions more laconic and thus easy to extract major information from the image, thereby can facilitate the image composition evaluation.

Now going back to FIG. 6. After the region attribution extraction step 620, next, at step 630 (region relationship description step), relationships among the regions are described based on the extracted attributions.

Just like the extracted attributions, the described relationships are used for image composition evaluation, and depend on the preset criteria for image composition evaluation. For example, the described relationships can comprise at least one of relative position, relative area proportion, color matching, texture matching and the like. Needless to say, the described relationships can also be any other suitable relationships required for image composition evaluation. Besides, the order for describing the relationships is not particularly limited. Attention may be paid to all kinds of regions in the region relationship description step 630.

Figure 23:
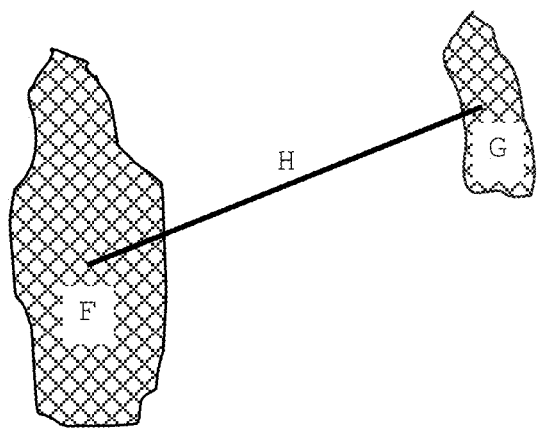
FIG. 23 schematically shows the relative position of two regions.

As for the relative position, for example, it can be considered whether the regions are neighbours. The adjacency matrix can be made almost the same as in the above step 1010, and no detailed description is given here for conciseness. It can also be considered if some regions are above major regions, such as a region recognized as human body. Or else, it can calculate the position and distance of non-adjacent major regions. FIG. 23 gives an example of the relative position of two regions F and G, where the distance H between regions F and G are calculated. Needless to say, any other relative position can also be calculated, if it is desired for image composition evaluation.

As for the relative proportion, for example, the area proportion of different regions labelled to the same class can be calculated. The area proportion of the major regions to the whole image can also be calculated. The proportion of summing areas of regions with different classes can be permitted, if desired. As an example, the following equation (5) can be used for calculating the relative proportion:

$$P_{Image}(r) = \frac{\text{Area}(r)}{\text{Area(image)}} = \frac{\text{Area}(r)}{W_{img} \times H_{img}} \times 100\%$$

$$P_{Max}(r) = \frac{\text{Area}(r)}{\text{Area}(R)} \times 100\% \quad r \neq R \quad (5)$$

where r is the region ID in an image (r=R is the region ID of the maximum region, $W_{img}$ and $H_{img}$ are the width and height of the image respectively, Area(r), Area(R) and Area(image) are the area of region r, the area of the maximum region R and the area of the image respectively. Needless to say, any other relative proportion can also be calculated, if it is desired for image composition evaluation.

In addition to the above-mentioned relative position and relative proportion, other relationships among the regions can also be calculated or described, i.e., which kinds of relationship can be used is not particularly limited. For example, color matching, texture matching or the like can be considered. It can help to judge the conflict view feeling in composition.

In one embodiment of the present invention, for example, the region relationship description step 630 may comprises at least one of the following steps: a relative position calculating step for calculating relative positions of the regions based on distances, neighbourhood and symmetries; and a coordination degree calculating step for calculating coordinate degrees among the regions based on relative area proportions, color matching and region complexity.

After the region relationship description step 630, next, at step 640 (composition evaluation step), the composition of the image is evaluated based on the extracted attributes, the described relationships and at least one preset criterion.

The composition evaluation step 640 is used to find locations and reasons for composition problems in the image with respect to the at least one preset criterion. The criteria are generally extracted from common reasons of unattractive composition, though which kinds of criterion must be included is not particularly limited. For example, it can comprise at least one of object on head, area size judgement, major object position judgement, kissing border, close to border, middle separation, color matching and the like. The order for evaluating the above various composition problems is not particularly limited.

As for criterion of object on head, generally, an object should not be on head. For example, it can be checked whether a region contiguous to the upper portion of a body region is an object, and whether the object region is more or less wholly over the body head or the upper portion of the body region. If Yes, it is evaluated that there is a composition problem as object on head.

Figure 24:
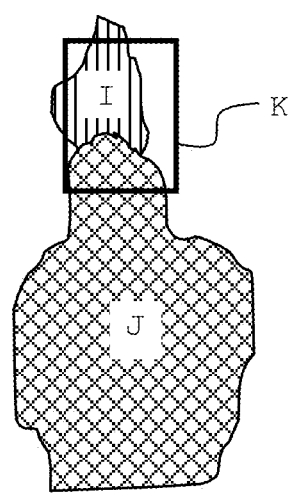
FIG. 24 schematically shows how to detect the object on head problem in the composition evaluation step according to the present invention.

FIG. 24 schematically shows how to detect the object on head problem. As shown in FIG. 24, the width of the top 10 percent of the body region J is used as the width of a detecting window K, and 1.5 times of the width is used as the height of the detecting window K. It is checked if there is a region inside the detecting window K and bordering the body region J. If Yes (just like region I), it is evaluated that there is a composition problem as object on head.

Figure 25A:
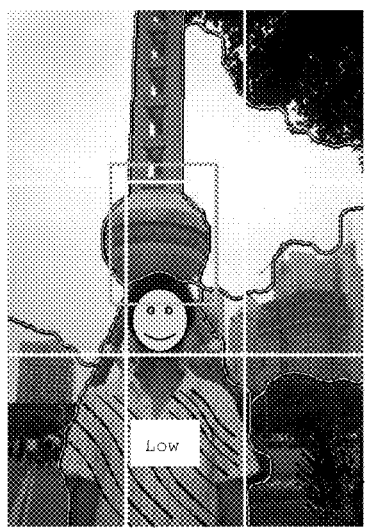
FIGS. 25A-25E show some exemplary composition problems detected by the image composition evaluating method according to the present invention.

FIG. 25A gives an example of such a composition problem detected by the image composition evaluating method according to the present invention. In FIG. 25A, the rectangle in the middle of the image indicates the object on head problem.

As for criterion of area size judgement, generally, the relative proportions of regions should not differ greatly. For example, it can be checked whether the area proportion of a class is harmonic to those of other classes. Thresholds and parameters can be defined, if necessary. As an example, if the area of a class is 100 percent larger than that of a $2^{nd}$ larger class, it is evaluated that the area of the class is large. On the contrary, if the area of a class is under 30 percent of that of a $2^{nd}$ smaller class, it is evaluated that the area of the class is small.

Figure 25B:
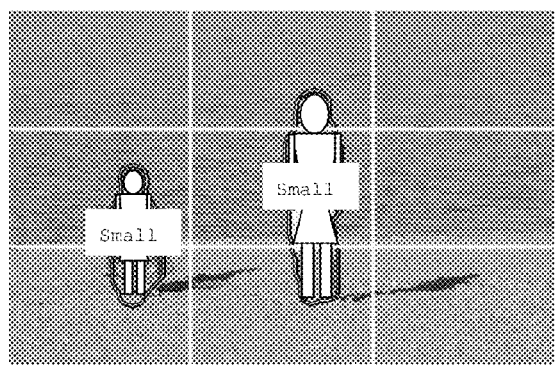
Figure 25C:
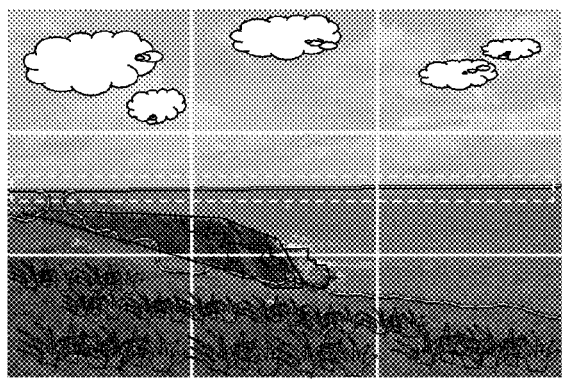
Figure 25D:

FIGS. 25B and 25D give examples of such a composition problem detected by the image composition evaluating method according to the present invention. In FIGS. 25B and 25D, text such as "small" and "large" indicates the area size problem.

As for criterion of major object position judgement, generally, the position of a major object or foreground should obey the number sign square grid of an image. The number sign square grid, which is shown in FIG. 16D and FIGS. 25A-25E, means that the width and height of an image are both split into 3 equal parts by 2 lines and thus the image is separated into 9 equal squares. According to a composition rule, it is better to place a major object at one of the 4 cross points which belong to the number sign square grid. If the major object is too high/low/right/left or else almost at the center point of the image, it is evaluated that there is a composition problem as major object High/Low/Right/Left/Center.

Figure 16D:
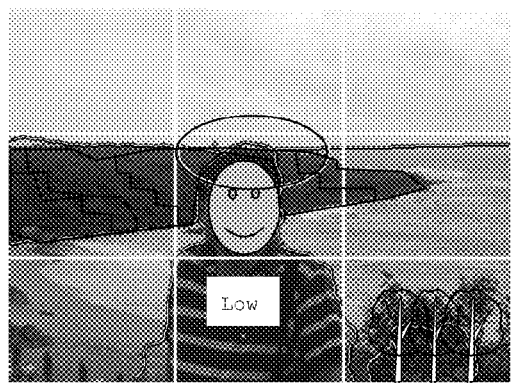

For example, in FIG. 16D, when the body region is taken as the major object, this evaluation can be described by the following equation (6):

$$position_{judge}(body) = \begin{cases} Low & G_{Center}(body).y > \frac{21}{30}H_{img} \\ High & G_{Center}(body).y < \frac{9}{30}H_{img} \\ Right & G_{Center}(body).x > \frac{21}{30}W_{img} \\ Left & G_{Center}(body).x < \frac{09}{30}W_{img} \\ Center & \frac{13}{30}W_{img} < G_{Center}(body).x < \frac{17}{30}W_{img} \\ Good & Others \end{cases} \quad (6)$$

As for criterion of kissing border, generally, a section of a major object's border should not just overlap a smooth border line which separates two background regions, e.g., the body should not kiss the border of other regions. According to a composition rule, if a major object, especially the human head, kisses border, the image composition looks depressive.

Figure 12:
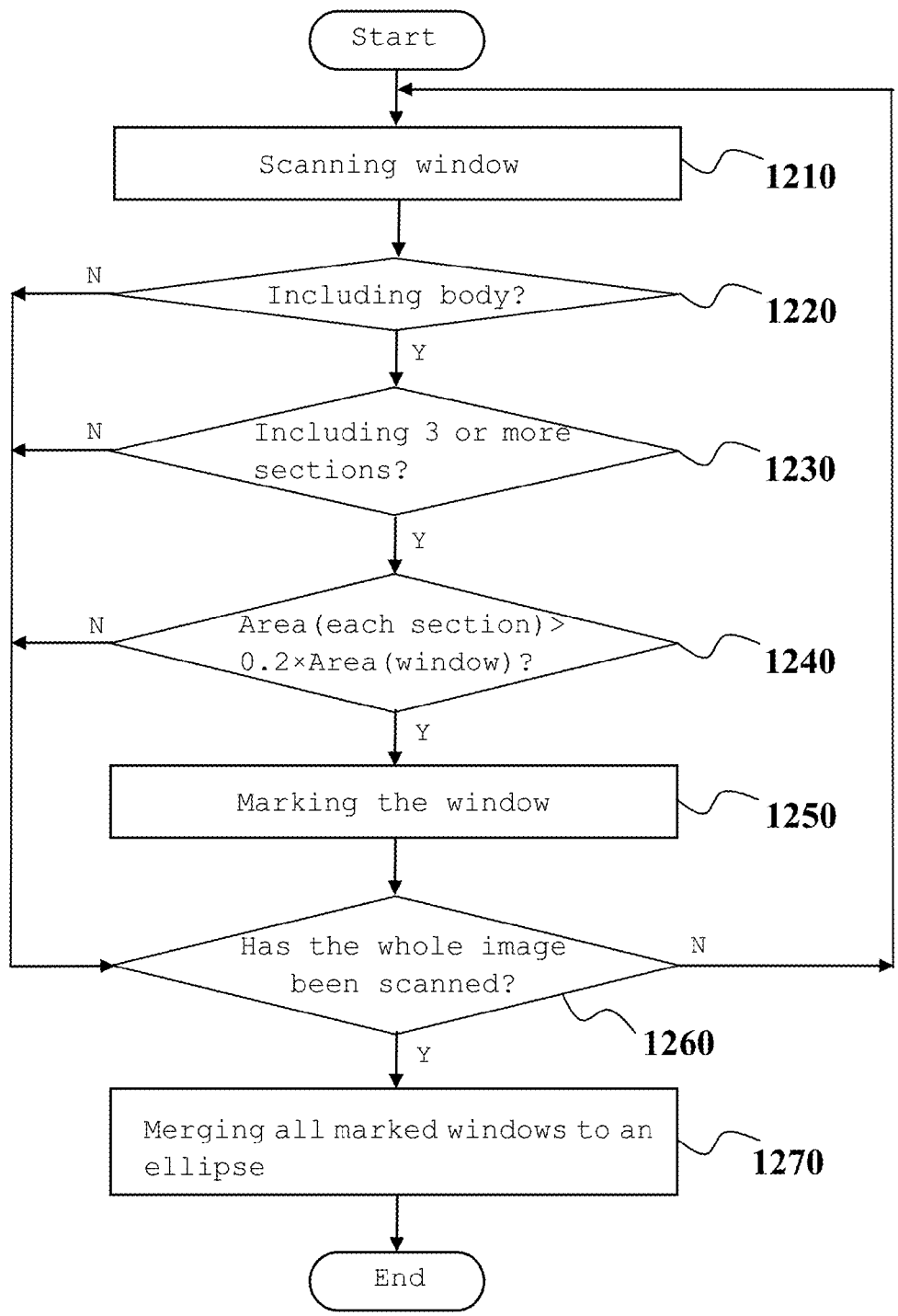
FIG. 12 schematically shows how to detect the kissing border problem in the composition evaluation step of the image composition evaluating method according to the present invention.

Usually, a scanning window can be used to check the kissing border problem in an image. For example, when the body region is taken as the major object, FIG. 12 exemplarily shows how to detect the kissing border problem. As shown in FIG. 12, at step 1210, the window is scanned. Next, at step 1220, it is judged whether the body is included in the window. If No at step 1220, the process goes to step 1260 which will be described later; if Yes at step 1220, the process advances to step 1230 where it is further judged whether 3 or more sections are included in the window. If No at step 1230, the process goes to step 1260; if Yes at step 1230, the process advances to step 1240 where it is further judged whether the area of each section is larger than, for example, 0.2×(the area of the window). If No at step 1240, the process goes to step 1260; if Yes at step 1240, the process advances to step 1250 where the window is marked. Next, the process advances to step 1260 where it is judged whether the whole image has been scanned. If No at step 1260, the process goes back to step 1210; if Yes at step 1260, the process advances to step 1270 where all marked windows are merged to an ellipse to highlight the area where the kissing border problem occurs.

FIG. 16D gives an example of such a composition problem detected by the image composition evaluating method according to the present invention. In FIG. 16D, the ellipse indicates the area where the kissing border problem occurs.

As for criterion of close to border, generally, a major object should not be too close to an image border. According to a composition rule, if some part of a major object is too close to an image border, the image composition seems unstable.

For example, this evaluation can be made as follows. It can be checked if a bounding box line, except for a bottom bounding box line, of a major object is too close to an image border. The threshold may be set as 10 percent for example, but it is not necessarily limited thereto. This evaluation can be described by the following equation (7):

$$\text{Close(major)} = \begin{cases} \text{top} & \text{Box(major).top} < 0.1 H_{img} \\ \text{left} & \text{Box(major).left} < 0.1 W_{img} \\ \text{right} & \text{Box(major).right} > 0.9 W_{img} \\ \text{none} & \text{Others} \end{cases} \quad (7)$$

where Box (major). top, Box (major). left and Box (major). right represent the top bounding box line, the left bounding box line and the right bounding box line of a major object, respectively. As described in equation (7), if the distance of a bounding box line and a nearest image border is under the threshold, it is evaluated that the object is too close to border. Moreover, the bounding box line that is too close to the border can be highlighted by a dashed line.

Figure 25E:
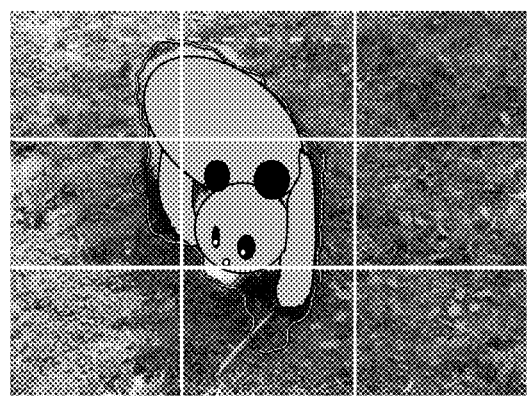

FIG. 25E gives an example of such a composition problem detected by the image composition evaluating method according to the present invention. In FIG. 25E, the dashed line indicates the close to border problem.

As for criterion of middle separation, generally, an image should not be separated in the middle, i.e., an image should not be separated into two major sections with the separating line in the middle of the image. According to a composition rule, if an image is separated in the middle, the image composition seems too purposive to be comfortable.

For example, this evaluation can be made as follows. The image center section is scanned from top to bottom, and it is checked if there is a separating line inside the scanned rectangle region. If there is such a separating line, even it does not cut through from the left to the right (e.g., over a threshold such as 80 percent of the image width), it is evaluated that the middle separation problem occurs.

FIG. 25C gives an example of such a composition problem detected by the image composition evaluating method according to the present invention. In FIG. 25C, the dashed rectangle highlights the middle separation problem.

As mentioned earlier, any other suitable criteria can be employed for the image composition evaluation as needed, and the present invention is not particularly limited in this regard, as long as composition rules are obeyed. For example, a color matching criterion can be defined as that an image should not be filled with simple green and simple red.

Through the above steps, the image composition can be evaluated according to the method of the present invention.

Now going back to FIG. 6. Optionally, after the composition evaluation step 640, step 650 (composition problem informing step) can be further performed for outputting and informing evaluated composition problems.

Up to now, the image composition evaluating method of the present invention has been schematically described.

Needless to say, the method of the present invention can be applied to various fields. For example, an information processing method can comprise the image composition evaluating method of the present invention so as to process information based on the image composition evaluation result.

As can be seen from the above description, unlike Fujifilm's Human Composition Judgement method based on major objects, the image composition evaluating method according to the present invention is based on image regions. More specifically, it extracts attributions inside each segmented region and describes relationships among the segmented regions, then makes image composition evaluation based on the extracted attributions and the described relationships. That is to say, it pays attention to all kinds of regions of a whole image (not only regions of special objects, but also other kinds of regions, especially regions belonging to the background), rather than only trained major objects. Thus, the effect of other regions to the image composition is improved. Those collected information is more similar to a manual method, and the criteria for evaluation are more close to human vision.

Due to the above reasons, one advantage of the present invention is that it can evaluate more kinds of images (actually, it can evaluate all kinds of images), including landscape images without special object, object images without human, human backside images without face etc. In contrast to this, Fujifilm's Human Composition judgement method can only deal with images with human faces.

Another advantage of the present invention is that it can evaluate more kinds of composition problems (actually, it can evaluate all kinds of composition problems as long as appropriate evaluation criteria are employed), including object on head, area size judgement, major object position judgement, kissing border, close to border, middle separation, color mismatching etc. In contrast to this, Fujifilm's Human Composition judgement method can only evaluate human position, more specifically, it can only help to make a human object in a center region of an image, which is far from enough for a good composition. Therefore, as for the present invention, the next choice based on image composition evaluation results is not limited to how to make a human object in a center region of an image; rather, complete guidance can be given as to how to obtain an image with excellent composition, such as by changing the shooting angle, avoiding disturbing substances etc.

The following Table 1 shows a rough comparison between the image composition evaluating method of the present invention and that of Fujifilm (i.e., the Human Composition judgement method). It is only illustrative, not exhaustive.

TABLE 1

|  | Composition Evaluation method of the present invention | Composition Evaluation method of Fujifilm |
|---|---|---|
| Can evaluate images containing human face | ✓ | ✓ |
| Can evaluate images without human | ✓ | x |
| Extracting human | ✓ | ✓ |
| Extracting major objects | ✓ | ✓ |
| Extracting background regions | ✓ | x |
| Scale limitation | ✓ | x |
| Position control | ✓ | ✓ |
| Analyzing region borders | ✓ | x |
| Analyzing region relationships | ✓ | x |

Hereinafter, an image composition evaluating apparatus and an information processing apparatus of the present invention will be described briefly with reference to FIGS. 13-15.

Figure 13:
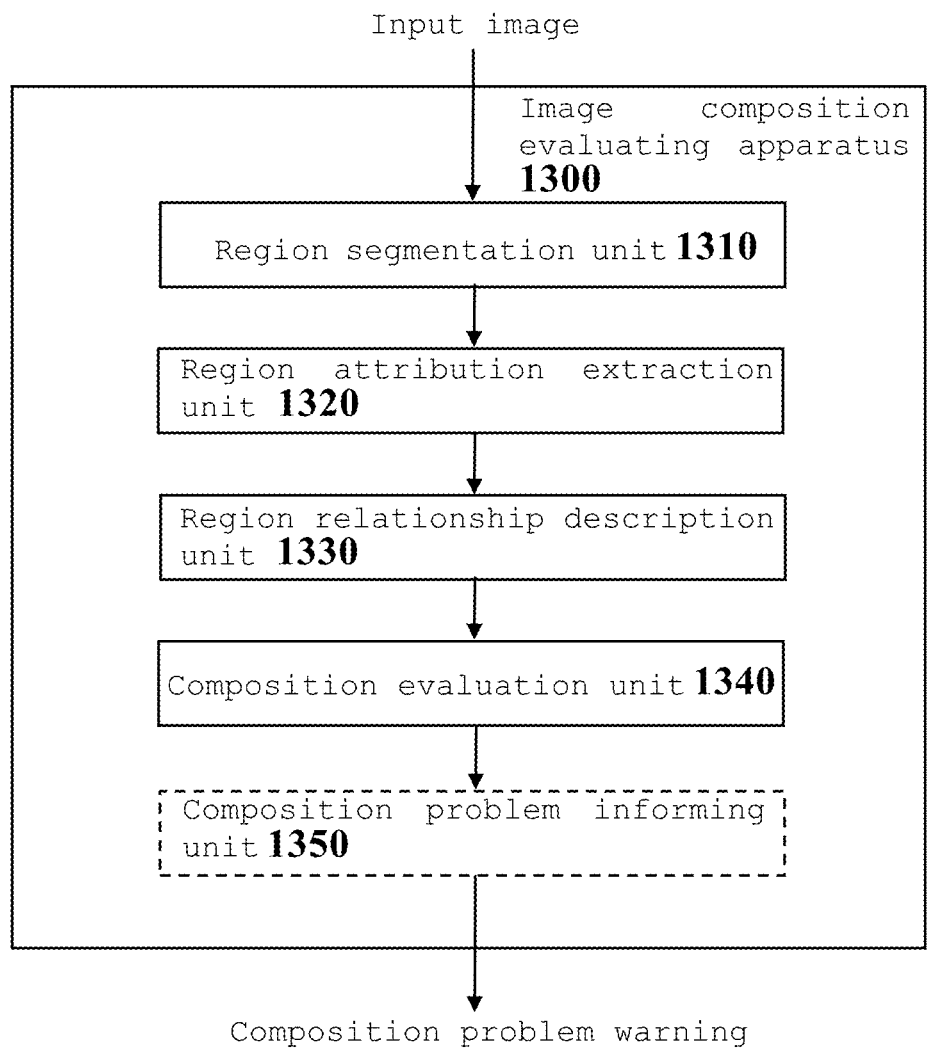
FIG. 13 schematically shows a general block diagram of the image composition evaluating apparatus according to the present invention.

FIG. 13 schematically shows a general block diagram of the image composition evaluating apparatus according to the present invention. As shown in FIG. 13, the apparatus for evaluating image composition 1300 can comprise the following units: a region segmentation unit 1310 configured to segment an image into a plurality of regions; a region attribution extraction unit 1320 configured to extract at least one attribution from each of the regions; a region relationship description unit 1330 configured to describe relationships among the regions based on the extracted attributions; and a composition evaluation unit 1340 configured to evaluate the composition of the image based on the extracted attributions, the described relationships and at least one preset criterion.

Optionally, the apparatus for evaluating image composition 1300 can further comprise the following unit: a composition problem informing unit 1350 configured to output and inform evaluated composition problems after evaluating the composition of the image based on the extracted attributions, the described relationships and at least one preset criterion.

In some embodiments of the present invention, an over-segmentation method can be employed to segment the image into the plurality of regions in the region segmentation unit 1310.

In some embodiments of the present invention, the over-segmentation method is a Felzenszwalb method or an SLIC method.

Figure 14:
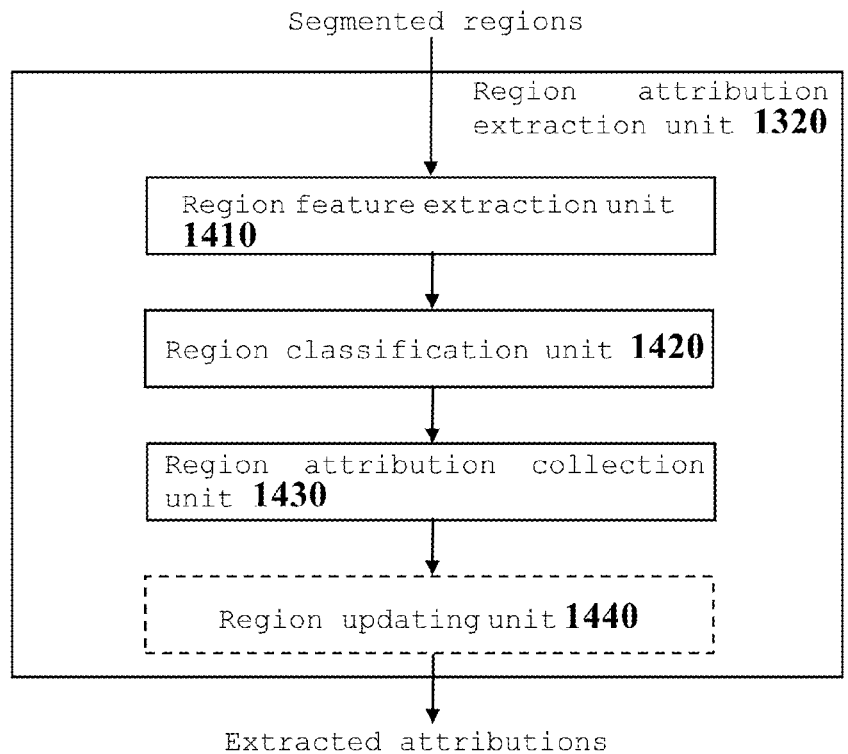
FIG. 14 schematically shows a block diagram of a region attribution extraction unit of the image composition evaluating apparatus according to the present invention.

Further, FIG. 14 schematically shows a block diagram of the region attribution extraction unit 1320 according to the present invention. As shown in FIG. 14, the region attribution extraction unit 1320 can further comprise the following units: a region feature extraction unit 1410 configured to extract at least one feature from each of the regions; a region classification unit 1420 configured to classify each of the regions into a preset class based on the extracted at least one feature and a trained model; and a region attribution collection unit 1430 configured to collect the at least one attribution for each of the regions.

Optionally, the region attribution extraction unit 1320 can further comprise the following unit: a region updating unit 1440 configured to merge isolated regions and to update the attributions of the regions after collecting the at least one attribution for each of the regions.

In some embodiments of the present invention, a Recursive Neural Network method is employed to classify each of the regions into the preset class in the region classification unit 1420.

Figure 15:
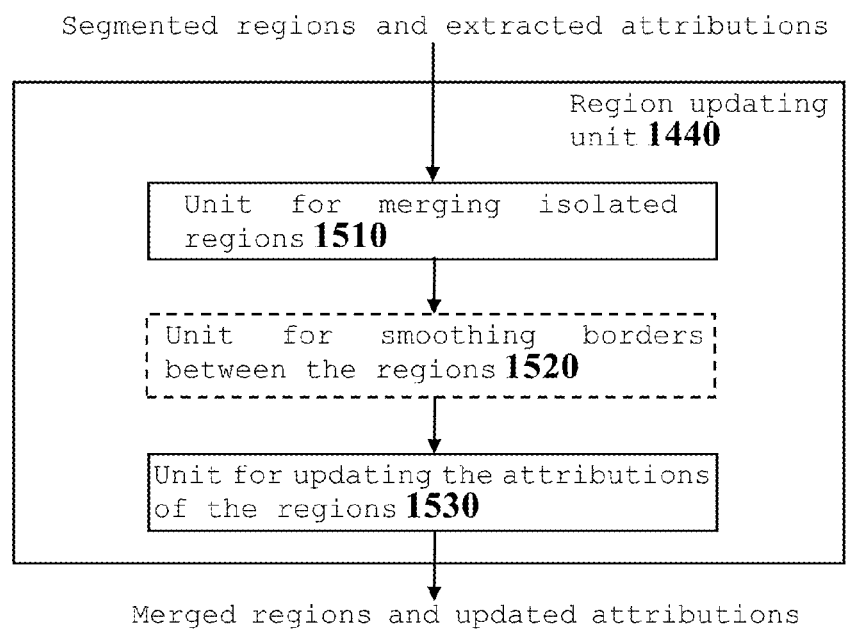
FIG. 15 schematically shows a block diagram of a region updating unit in the region attribution extraction unit according to the present invention.

Further, FIG. 15 schematically shows a block diagram of the region updating unit 1440 according to the present invention. As shown in FIG. 15, the region updating unit 1440 can further comprise the following units: a unit configured to merge isolated regions 1510; and a unit configured to update the attributions of the regions 1530.

Optionally, the region updating unit 1440 can further comprise the following unit: a unit configured to smooth borders between the regions 1520.

In some embodiments of the present invention, when updating the attributions of the regions in the region updating unit 1440, if a plurality of regions merged into one region have more than one class, the class for the one merged region is the one that most of the plurality of regions have.

In some embodiments of the present invention, the region relationship description unit 1330 can further comprise at least one of the following units: a relative position calculating unit configured to calculate relative positions of the regions based on distances, neighbourhood and symmetries; and a coordination degree calculating unit configured to calculate coordinate degrees among the regions based on relative area proportions, color matching and region complexity.

In some embodiments of the present invention, the composition evaluation unit 1340 can find locations and reasons for composition problems in the image with respect to the at least one preset criterion.

In some embodiments of the present invention, the image can be a photographic image.

In some embodiments of the present invention, the extracted attributions and the described relationships can depend on the at least one preset criterion.

In some embodiments of the present invention, the extracted attributions can comprise at least one of class, position, size, color and texture.

In some embodiments of the present invention, the described relationships can comprise at least one of relative position, relative area proportion, color matching and texture matching.

In some embodiments of the present invention, the at least one preset criterion can comprise at least one of object on head, area size judgement, major object position judgement, kissing border, close to border, middle separation and color matching.

In some embodiments of the present invention, there can be provided an information processing apparatus comprising the apparatus for evaluating image composition according to the present invention.

Up to now, the image composition evaluating apparatus and the information processing apparatus according to the present invention have been described schematically. It shall be noted that, all the above apparatuses are exemplary preferable modules for implementing the image composition evaluating method and the information processing method of the present invention. However, modules for implementing the various steps are not described exhaustively above. Generally, where there is a step of performing a certain process, there is a corresponding functional module or means for implementing the same process. In addition, it shall be noted that, two or more means can be combined as one means as long as their functions can be achieved; on the other hand, any one means can be divided into a plurality of means, as long as similar functions can be achieved.

It is possible to implement the methods, devices and apparatuses of the present invention in many ways. For example, it is possible to implement the methods, devices and apparatuses of the present invention through software, hardware, firmware or any combination thereof. In addition, the above described order of the steps for the methods is only intended to be illustrative, and the steps of the methods of the present invention are not necessarily limited to the above specifically described order unless otherwise specifically stated. For example, although the region attribution collection step 730 is performed after the region classification step 720 in FIG. 7, some attributions can also be collected simultaneously with the region classification step 720 or before the region classification step 720; although the border smoothing step 1020 is performed after the isolated region merging step 1010 in FIG. 10, it can also be performed before the isolated region merging step 1010. Besides, in some embodiments, the present invention can also be embodied as programs recorded in a recording medium, including machine-readable instructions for implementing the methods according to the present invention. Thus, the present invention also covers recording mediums which store the programs for implementing the methods according to the present invention.

While the present invention has been described with reference to exemplary embodiments, it is to be understood that the present invention is not limited to the disclosed exemplary embodiments. It is apparent to those skilled in the art that the above exemplary embodiments may be modified without departing from the scope and spirit of the present invention. The scope of the following claims is to be accorded the broadest interpretation so as to encompass all such modifications and equivalent structures and functions.

What is claimed is:

1. An apparatus for evaluating image composition comprising:
one or more memories that store a set of instructions; and
one or more processors that execute the set of instructions to:
segment an image into a plurality of regions;
extract at least one feature from each of the plurality of regions;
classify each of the plurality of regions into a preset class based on the extracted at least one feature and a trained model;
extract at least one attribution from each of the plurality of regions;
collect the at least one attribution for each of the plurality of regions;
merge isolated regions in the plurality of regions and update the attributions of the merged regions after collecting the at least one attribution for each of the plurality of regions;
describe relationships among the plurality of regions based on the extracted attributions; and
evaluate a composition of the image to determine whether at least one composition problem is included in the image, based on the extracted attributions, the described relationships and at least one preset criterion,
wherein when updating the attributions of the merged regions, if a plurality of regions merged into one region have more than one class, the class for the one merged region is the one that most of the plurality of regions have.

2. The apparatus according to claim 1, wherein an over-segmentation method is employed to segment the image into the plurality of regions.

3. The apparatus according to claim 2, wherein the over-segmentation method is a Felzenszwalb method or an SLIC method.

4. The apparatus according to claim 1, wherein a Recursive Neural Network method is employed to classify each of the plurality of regions into the preset class.

5. The apparatus according to claim 1, wherein the one or more processors execute the set of instructions to smooth borders between the regions after merging isolated regions and before updating the attributions of the regions.

6. The apparatus according to claim 1, wherein the one or more processors execute the set of instructions to:
calculate relative positions of the plurality of regions based on distances, neighbourhood and symmetries; and
calculate coordinate degrees among the plurality of regions based on relative area proportions, color matching and region complexity.

7. The apparatus according to claim 1, wherein the one or more processors execute the set of instructions to find locations and reasons for the at least one composition problem in the image with respect to the at least one preset criterion.

8. The apparatus according to claim 1, wherein the one or more processors execute the set of instructions to:
output and inform of the at least one composition problem after evaluating the composition of the image based on the extracted attributions, the described relationships and the at least one preset criterion.

9. The apparatus according to claim 1, wherein the image is a photographic image.

10. The apparatus according to claim 1, wherein the extracted attributions and the described relationships depend on the at least one preset criterion.

11. The apparatus according to claim 1, wherein the extracted attributions comprise at least one of class, position, size, color and texture.

12. The apparatus according to claim 1, wherein the described relationships comprise at least one of relative position, relative area proportion, color matching and texture matching.

13. The apparatus according to claim 1, wherein the at least one preset criterion comprises at least one of object on head, area size judgement, major object position judgement, kissing border, close to border, middle separation and color matching.

14. The apparatus according to claim 1, wherein the at least one composition problem includes at least one of an object on head, area size judgement, major object position judgement, kissing border, close to border, middle separation, and color matching.

15. A method for evaluating image composition comprising:
segmenting an image into a plurality of regions;
extracting at least one feature from each of the plurality of regions;
classifying each of the plurality of regions into a preset class based on the extracted at least one feature and a trained model;
extracting at least one attribution from each of the plurality of regions;
collecting the at least one attribution for each of the plurality of regions;
merging isolated regions in the plurality of regions;
updating the attributions of the merged regions after collecting the at least one attribution for each of the plurality of regions, wherein when updating the attributions of the merged regions, if a plurality of regions merged into one region have more than one class, the class for the one merged region is the one that most of the plurality of regions have;
describing relationships among the plurality of regions based on the extracted attributions; and
evaluating a composition of the image to determine whether at least one composition problem is included in the image, based on the extracted attributions, the described relationships and at least one preset criterion.

16. A non-transitory computer-readable medium storing instructions, which when executed by one or more processors, cause the one or more processors to perform a method comprising:
segmenting an image into a plurality of regions;
extracting at least one feature from each of the plurality of regions;
classifying each of the plurality of regions into a preset class based on the extracted at least one feature and a trained model;
extracting at least one attribution from each of the plurality of regions;
collecting the at least one attribution for each of the plurality of regions;
merging isolated regions in the plurality of regions;
updating the attributions of the merged regions after collecting the at least one attribution for each of the plurality of regions, wherein when updating the attributions of the merged regions, if a plurality of regions merged into one region have more than one class, the class for the one merged region is the one that most of the plurality of regions have;

describing relationships among the plurality of regions based on the extracted attributes; and evaluating a composition of the image to determine whether at least one composition problem is included in the image, based on the extracted attributes, the described relationships and at least one preset criterion.

* * * * *